US008576813B2

(12) United States Patent
Moritomo et al.

(10) Patent No.: US 8,576,813 B2
(45) Date of Patent: Nov. 5, 2013

(54) COMMUNICATION SYSTEM, COMMUNICATION APPARATUS, AND COMMUNICATION METHOD

(75) Inventors: Kazuo Moritomo, Kawasaki (JP); Akane Yokota, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1096 days.

(21) Appl. No.: 12/257,122

(22) Filed: Oct. 23, 2008

(65) Prior Publication Data
US 2009/0092068 A1 Apr. 9, 2009

Related U.S. Application Data

(62) Division of application No. 11/267,556, filed on Nov. 4, 2005, now Pat. No. 7,489,669.

(30) Foreign Application Priority Data

Nov. 5, 2004 (JP) .................................. 2004-322325

(51) Int. Cl.
*H04W 4/00* (2009.01)
(52) U.S. Cl.
USPC .......... 370/338; 370/328; 455/574; 455/13.4; 455/127.5
(58) Field of Classification Search
USPC ............... 370/338, 328; 455/574, 13.4, 127.5
See application file for complete search history.

(56) References Cited

U.S. PATENT DOCUMENTS

| 2004/0125778 A1 | 7/2004 | Lin et al. |
| 2004/0205158 A1 | 10/2004 | Hsu |

FOREIGN PATENT DOCUMENTS

| JP | 09-135254 | 5/1997 |
| JP | 2003-022351 A | 1/2003 |
| JP | 2003-069879 A | 3/2003 |
| JP | 2004-213548 A | 7/2004 |
| JP | 2007-081730 A | 3/2007 |

OTHER PUBLICATIONS

Japanese Office Action dated May 29, 2012 for JP 2009-195424.

*Primary Examiner* — Wayne Cai
(74) *Attorney, Agent, or Firm* — Carter, DeLuca, Farrell & Schmidt LLP

(57) ABSTRACT

In an ad hoc mode based on IEEE802.11 standard, when a wireless terminal performs a power save operation to create a network, and a network identifier identical to that of the network to be created is present, the wireless terminal does not join the network. When the wireless terminal is to join the network, and the network identifier identical to that of the network which the wireless terminal is to join is not present, the wireless terminal does not join any network. In this method, reliable connectivity can be obtained in the ad hoc mode which is not defined in the IEEE802.11 standard in detail.

3 Claims, 13 Drawing Sheets

FLOWCHART OF CAMERA SIDE IN SECOND EMBODIMENT

SYSTEM CONFIGURATION VIEW OF DSC AND PRINTER IN WIRELESS CONNECTION

FUNCTIONAL BLOCK DIAGRAM OF DSC HAVING WIRELESS COMMUNICATION FUNCTION

FUNCTIONAL BLOCK DIAGRAM OF PRINTER HAVING WIRELESS COMMUNICATION FUNCTION

FIG. 4

| WIRELESS COMMUNICATION ITEM | DETAILED DATA |
|---|---|
| Network Mode | AD HOC / Infrastructure |
| SSID Type | abcd1234 |
| CH Number | 7 ch (USE ONLY IN AD HOC OPERATION) |
| Authentication Type | Open / Shared |
| Encryption Type | WEP50 / WEP104 / WPA-PSK etc |
| Encryption Key | efgh5678 |
| Device ID | Printer / DSC / PC and Maker |
| AD HOC PS | On / Off |

WIRELESS COMMUNICATION SETTING INFORMATION

WIRELESS COMMUNICATION INFORMATION SETTING METHOD

FLOWCHART OF CAMERA SIDE IN FIRST EMBODIMENT

FIG. 9

| FIRST 3 bytes OF MAC Address |
|---|
| 0x112233 |
| 0x223344 |
| 0x556677 |
| 0xaabbcc |
| 0xddeeff |

FIRST THREE BYTES OF MAC Address OF NETWORK DEVICE VENDER

FIG. 10

| Octets:2 | 2 | 6 | 6 | 6 | 2 | 0-2412 | 4 |
|---|---|---|---|---|---|---|---|
| Frame Control | Duration | DA | SA | BSSID | Sequence Control | Frame Body | FCS |

Management FRAME FORMAT

FLOWCHART OF CAMERA SIDE IN SECOND EMBODIMENT

COMMUNICATION SYSTEM, COMMUNICATION APPARATUS, AND COMMUNICATION METHOD

CROSS-REFERENCE TO RELATED APPLICATIONS

This is divisional of co-pending application Ser. No. 11/267,556, filed Nov. 4, 2005.

FIELD OF THE INVENTION

The present invention relates to a communication system, communication apparatus, and communication method.

BACKGROUND OF THE INVENTION

According to the IEEE (Institute of Electrical and Electronics Engineers) 802.11 standard, two modes are available as communication modes used when a plurality of wireless terminals communicate with each other. One is an infrastructure mode in which the wireless terminals communicate with each other via a base station (access point, to be referred to as an AP hereinafter). The other is an ad hoc mode in which the wireless terminals directly communicate with each other without mediacy of a specific AP.

Also, as the operation states of a wireless terminal based on IEEE802.11 standard, two operation modes are available. One is an "active mode" representing a normal operation, and the other is a "power save mode (to be referred to as a PS mode hereinafter)" representing a power saving mode operation. The PS mode has two states, i.e., an "Awake state (receivable state)" in which power is completely supplied to a transmission/reception circuit and the like in the wireless unit of the wireless terminal, and a "Doze state (inactive state)" in which only minimum power is supplied to that. In the "Awake state", data can be transmitted/received. However, in the "Doze state", no data can be transmitted/received. In the PS mode, the wireless terminal repeatedly shifts between the "Awake state" and "Doze state", periodically.

In the ad hoc mode, in order to transmit data to the wireless terminal in the PS mode, an ATIM (Announcement Traffic Indication Message) frame is transmitted into an ATIM window. The ATIM window is a period which starts from TBTT (Target Beacon Transmission Time) of the periods shown in FIG. 13, and its size can be known in accordance with a "Beacon", "Probe Response", and the like. In this period, all the terminals including the terminals in the PS mode are in the "Awake state", and only the "Beacon" and ATIM frame are allowed to be transmitted.

A PS mode operation in the ad hoc mode will be described below with reference to FIG. 13. In an example shown in FIG. 13, three wireless terminals, i.e., terminals A, B, and C construct a network in the ad hoc mode, and operate in the PS mode.

In order to transmit data from the terminal A to the terminal B, first, the terminal A announces data transmission by sending the ATIM frame to the terminal B. Upon reception of the ATIM frame, the terminal B recognizes that the data is to be transmitted from the terminal A. Accordingly, in a "Beacon" interval, the terminal B does not shift from the "Awake state" to the "Doze state" but is maintained in the "Awake state". Then, in order to notify the terminal A of reception of the ATIM frame from the terminal A, the terminal B transmits an ACK (acknowledgement) signal to the terminal A. Upon confirmation of reception of the ACK signal, the terminal A transmits the data to the terminal B. When the data is completely received from the terminal A, the terminal B transmits the ACK signal to the terminal A. When the terminal A confirms reception of this ACK signal, one data transmission/reception has been performed between the terminals A and B.

Alternatively, as shown in FIG. 13, a terminal C having no relationship to this data transmission/reception repeatedly shifts between the "Awake state" and "Doze state" unless the ATIM frame is received.

When the terminal B transmits data by multicasting, the ATIM frame must also be transmitted. In this case, all the terminals in the network are in the "Awake state". However, the ACK signal need not be transmitted to this ATIM frame.

In another power saving management method in the ad hoc mode, it is detected whether a self terminal stores extra power. If it is detected that the self terminal stores extra power, the terminal preferentially outputs the "Beacon" (see Japanese Patent Laid-Open Publication 9-135254 (Japanese Patent No. 2708028)).

However, the IEEE802.11 standard does not define a method of confirming whether a communication partner station functions in the PS mode when the self-station operates in the ad hoc mode. Hence, when the partner station operates in the PS mode, and a self-station is to communicate with the partner station without knowing the partner station state, the self-station can start transmitting the data without the ATIM frame. In this case, since the partner station may be in the "Doze state", the partner station may fail to receive the data, and normal data transmission is not guaranteed.

The IEEE802.11 standard does not define a method of notifying the partner station of the self-station state when the self-station operates in the PS mode. Hence, when the self-station operates in the PS mode, and the partner station communicates with the self-station without knowing the self-station state, the partner station transmits the data without the ATIM frame. Therefore, when the self-station is in the "Doze state", the self-station may fail to receive the data, and normal data transmission is not guaranteed.

SUMMARY OF THE INVENTION

It is an object of the present invention to ensure connection in a power saving mode in an ad hoc mode.

According to the present invention, a communication system including a first communication apparatus which creates a network, and a second communication apparatus which joins the network, at least the first communication apparatus and the second communication apparatus sharing a network identifier, and directly communicating with each other, is characterized in that the first communication apparatus has a power saving management function, and when the first communication apparatus is to create the network by validating the power saving management function, and a signal including a network identifier identical to the network identifier of the network which is to be created by the first communication apparatus is detected, the first communication apparatus does not join the network.

According to the present invention, a communication apparatus is comprising a communication device to adapted to have a power saving management function, a determination device adapted to determine whether a setting of the power saving management function is valid, a detection device adapted to, when a network is to be created, detect a signal including a network identifier identical to a network identifier of the network to be created, and a control device adapted to, when the detection device detects the signal including the network identifier identical to the network identifier of the network to be created, control the communication apparatus to join the network in accordance with determination of the determination device.

According to the present invention, a communication apparatus is further comprising a power saving management function, wherein when the communication apparatus is to join a network by validating the power saving management function, and a signal including a network identifier identical to a network identifier of the network to which the communication apparatus is to join cannot be detected, the network is not created.

According to the present invention, a communication apparatus is comprising a communication device adapted to have a power saving management function, a discrimination device adapted to, when a network is to be created by validating the power saving management function of the communication device, discriminate whether a network identifier of the network to be created has already been used by another communication apparatus, a deciding device adapted to decide whether the power saving management function of the communication device is valid, and a device adapted to allow the communication apparatus to join the network having the network identifier, in accordance with discrimination of the discrimination device and decision of the deciding device.

According to the present invention, a communication apparatus is comprising communication device adapted to have a power saving management function, a discrimination device adapted to discriminate identification information of another communication apparatus which constructs a network which the communication apparatus is to join, and a join device adapted to allow the communication apparatus to join the network by invalidating the power saving management function, in accordance with the identification information discriminated by the discrimination device.

According to the present invention, a communication method for a communication apparatus having a power saving management function, is comprising a determination step of determining whether a setting of the power saving management function is valid, a detection step of, when a network is to be created, detecting a signal including a network identifier identical to a network identifier of the network to be created, and a join step of, when the signal including the network identifier identical to the network identifier of the network to be created is detected in the detection step, allowing the communication apparatus to join the network in accordance with determination in the determination step.

According to the present invention, a communication method for a communication apparatus having a power saving management function, is characterized in that when the communication apparatus joins a network by validating the power saving management function, and a signal including a network identifier identical to a network identifier of the network to which the communication apparatus is to join cannot be detected, the network is not created.

According to the present invention, a communication method for a communication apparatus having a power saving management function, is comprising a discrimination step of, when a network is to be created by validating the power saving management function, discriminating whether a network identifier of the network to be created has already been used by another communication apparatus, a deciding step of deciding whether the power management control function is valid, and a join step of allowing the communication apparatus to join the network having the network identifier, in accordance with discrimination in the discriminating step and decision in the deciding step.

According to the present invention, a communication method for a communication apparatus having a power saving management function, is comprising a discrimination step of discriminating identification information of another communication apparatus which constructs a network which the communication apparatus is to join, a join step of allowing the communication apparatus to join the network by invalidating the power saving management function in accordance with the identification information which is discriminated in the discrimination step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 4 is a view showing parameters in detail;

FIG. 9 is a view showing an example of the first three bytes of a MAC address;

FIG. 10 is a view showing a Management frame format;

DETAILED DESCRIPTION OF THE PREFERRED EMBODIMENTS

Preferred embodiments of the present invention will be described in detail in accordance with the accompanying drawings.

First Embodiment

Figure 1:
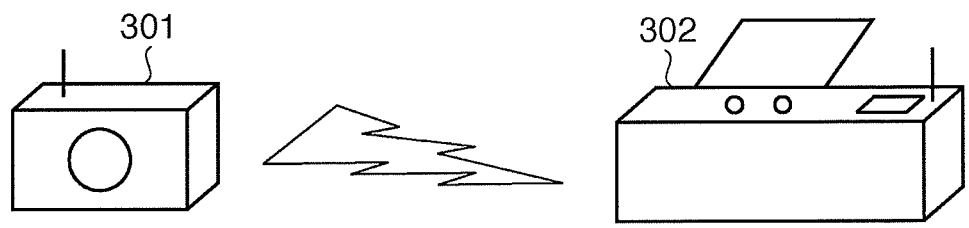
FIG. 1 is a schematic view showing a wireless communication system according to the first embodiment of the present invention.

The first embodiment of the present invention will be described below. In the first embodiment, a digital still camera serving as an image sensing apparatus and a printer serving as an output apparatus are wirelessly connected in an ad hoc mode based on IEEE802.11 standard. These digital still camera and printer operate in a PS mode. This process is the same as that in the second embodiment (to be described below). FIG. 1 is a schematic view showing a wireless communication system according to the first embodiment of the present invention.

In the first embodiment, a digital still camera (to be referred to as a DSC hereinafter) 301 is provided which has a wireless communication function. The DSC 301 can transfer data to a printer, personal computer, and the like via a wireless communication device. A printer 302 is also provided which has the same wireless communication function. The DSC 301 and printer 302 are wirelessly connected with each other in the ad hoc mode based on IEEE802.11 standard. Accordingly, image data sensed by the DSC 301 is wirelessly transmitted to the printer 302, and output at the printer 302.

Figure 2:
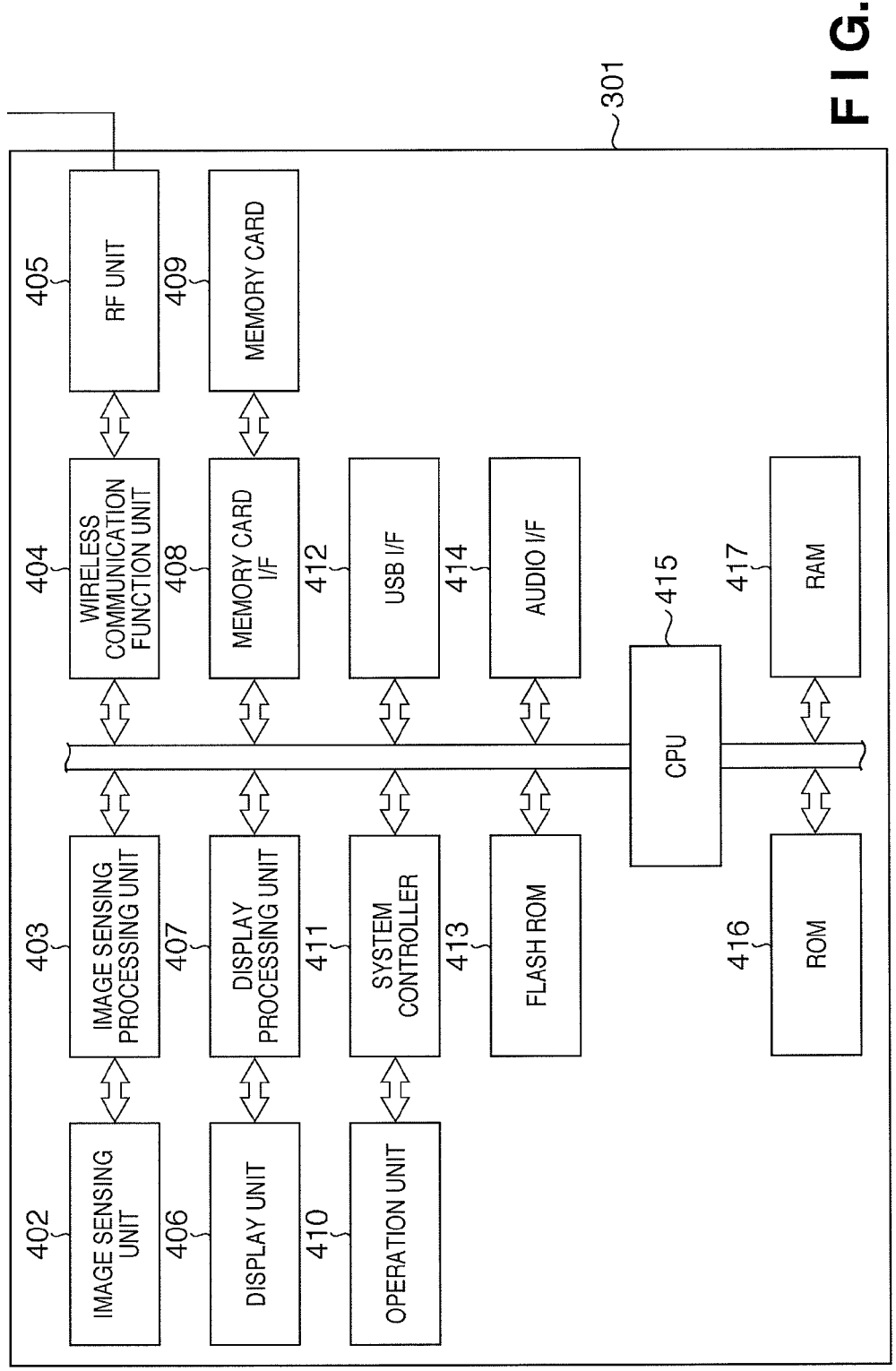
FIG. 2 is a functional block diagram showing an arrangement of a DSC 301.

FIG. 2 is a functional block diagram showing an arrangement of the DSC 301. The DSC 301 includes an image sensing unit 402, image sensing processing unit 403, wireless communication function unit 404, RF (Radio Frequency) unit 405, display unit 406, display processing unit 407, memory card interface (I/F) 408, memory card 409, operation unit 410, system controller 411, USB interface (I/F) 412, flash ROM 413, audio interface (I/F) 414, CPU 415, ROM 416, and RAM 417.

The operation unit 410 is connected to the CPU 415 via a system controller 411, and includes, e.g., the shutter switch and various keys of the DSC 301. An image sensing unit 402 is a block which senses an image when the shutter is pressed, and controlled by the image sensing processing unit 403.

The display unit 406 is a block which displays information to a user (e.g., LCD display, LED display, and audio indication). The display contents of the display unit 406 are controlled by the display processing unit 407. An operation such as selection of an instruction in accordance with information displayed on the display unit 406 is performed in synchronism with the operation unit 410. That is, the display unit 406 and operation unit 410 mainly construct the user interface (I/F) of the DSC 301.

The wireless communication function unit 404 is a block to perform wireless communication, and the RF unit 405 transmits/receives a radio signal to/from another wireless communication device. The memory card I/F 408 is used to connect the memory card 409, the USB I/F 412 is used to connect an external device via a USB, and the audio I/F 414 is used to exchange an audio signal with an external device.

These functional units shown in the block diagram are processed under the control of the CPU 415, and programs controlled by the CPU 415 are stored in, e.g., the ROM 416 or flash ROM 413. Data processed by the CPU 415 is written/read out in/from, e.g., the RAM 417 or the flash ROM 413.

The flash ROM 413 is a nonvolatile storage area. In the flash ROM 413, wireless communication setting information and the like are stored. Note that sensed image data is written (saved) in the memory card 409 via the memory card I/F 408 after a well-known compression process.

Figure 3:
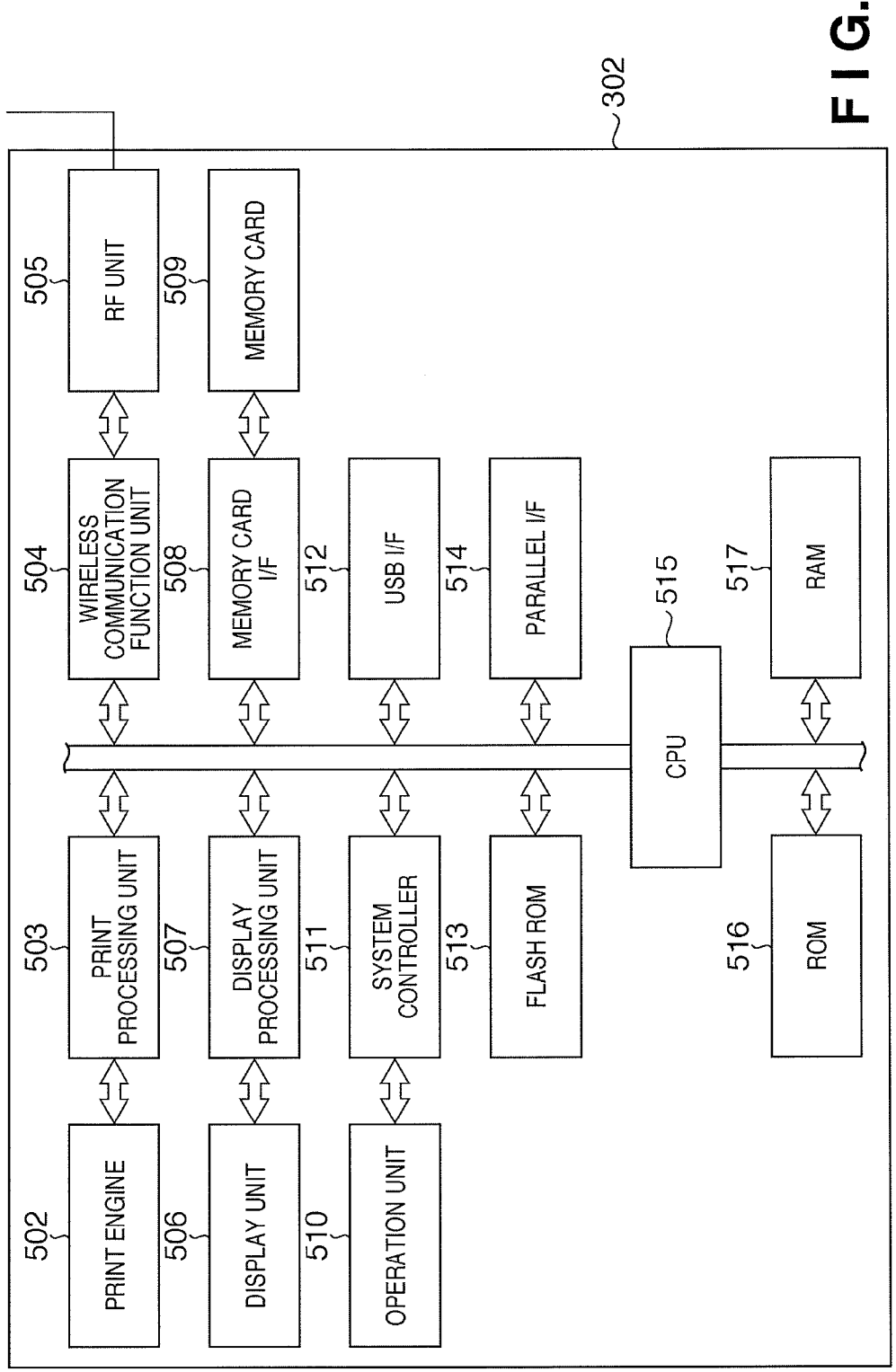
FIG. 3 is a functional block diagram showing an arrangement of a printer 302.

FIG. 3 is a functional block diagram showing an arrangement of the printer 302. The printer 302 includes a print engine 502, print processing unit 503, wireless communication function unit 504, RF unit 505, display unit 506, display processing unit 507, memory card I/F 508, memory card 509, operation unit 510, system controller 511, USB I/F 512, flash ROM 513, parallel I/F 514, CPU 515, ROM 516, and RAM 517.

The operation unit 510 is connected to the CPU 515 via the system controller 511. The print engine 502 is a functional block which actually prints an image on paper, and controlled by the printing process unit 503. The printing method performed by the print engine 502 is arbitrary. For example, an inkjet printer which discharges ink droplets by thermal energy onto a printing medium such as a printing sheet is available.

The display unit 506 is a block which displays information to the user (e.g., LCD display, LED display, and audio indication), and the display contents of the display unit 506 are controlled by the display processing unit 507. An operation such as selection of an instruction in accordance with information displayed on the display unit 506 is performed via the operation unit 510. That is, the display unit 506 and operation unit 510 mainly construct a user I/F of the printer 302.

The wireless communication function unit 504 is a block to perform wireless communication, and the RF unit 505 transmits/receives the radio signal to/from another wireless communication device. The memory card I/F 508 is used to connect the detachable memory card 509. A memory card which was mounted in the DSC 301 is inserted into the memory card I/F 508, and then a sensed image can be printed. The USB I/F 512 is used to connect an external device via a USB, and the parallel I/F 514 is used to connect the external device (mainly, host computer) using parallel communication.

These functional units shown in the block diagram are processed under the control of the CPU 515, and programs controlled by the CPU 515 are stored in, e.g., the ROM 516 or flash ROM 513. Data processed by the CPU 515 is written/read out in/from the RAM 517 or the flash ROM 513. The flash ROM 513 is a nonvolatile storage area, and wireless communication setting information and the like are stored in the flash ROM 513.

In the state shown in FIG. 1, an ad hoc network has been created between the DSC 301 and printer 302, and performed wireless communication. According to the first embodiment, parameters required to create the ad hoc network and a setting method therefor will be described below. FIG. 4 is a view showing parameters in detail.

In the first embodiment, eight parameters are provided to establish wireless connection, i.e., "Network Mode", "SSID Type", "CH Number", "Authentication Type", "Encryption Type", "Encryption Key", "Device ID", and "Ad hoc PS". According to the first embodiment, these parameters are set in the DSC 301 in advance, and then transferred to the printer 302 (to be described later).

The parameter "Network Mode" is an item for designating whether a network creation method is in an "Infrastructure" or "Ad hoc" mode. In the following description, assume that the network creation method is in the "Ad hoc" mode.

The parameter "SSID Type" is an item for designating an "ESS ID" serving as a network identifier. In the first embodiment, assume that the value of this item is automatically calculated and set using a specific algorithm on the basis of a device fixed value such as the serial number of the DSC 301. Therefore, since this value is represented by random alphanumeric characters, the value cannot be artificially set. The same ESS ID is not set for another DSC. Furthermore, the value of the parameter "SSID Type" cannot be rewritten unless the parameter is exceptionally rewritten via wired connection such as a USB with the personal computer or the like. In the following description, assume that the value of the parameter "SSID Type" is not rewritten.

The parameter "CH Number" is an item for designating a frequency channel to be used. This item is used only when the network is created in the ad hoc mode.

The parameter "Authentication Type" is an item for designating an authentication method which is applied in the network. More specifically, the user selects an "Open System" or "Shared System".

The parameter "Encryption Type" is an item for designating an encryption method which is applied in the network. More specifically, the user selects a "WEP (40 bits)", "WEP (104 bits)", or "WPA-PSK".

The parameter "Encryption Key" is an item for designating a key used to perform encryption. Its key length changes due to variations in encryption means, and set by user's direct input.

The parameter "Device ID" is an identifier allocated to each device, and unique to the device. For example, on the basis of this identifier, it can be identified whether the device is the DSC 301 or printer 302. Also, on the basis of this identifier, a manufacturer and the like can be identified. For example, this value is set when shipping from a factory, and cannot be rewritten after that.

The parameter "Ad hoc PS" is an item for deciding the presence/absence of a PS mode operation in the ad hoc mode, and set by the user. If this item is "ON", the device operates in the PS mode of the ad hoc mode. If this item is "OFF", the terminal does not operate in the PS mode. Note that in the device without a PS mode function in the ad hoc mode, this parameter is always set "OFF", and cannot be rewritten to "ON".

According to the first embodiment, as shown in FIG. 1, the personal computer (PC) is not present in the wireless communication system. Hence, the parameter of the DSC 301 or printer 302 cannot be set by the PC. The printer 302 does not have the user interface (UI) for setting the parameter in detail as shown in FIG. 4, because a versatile printer is assumed to be used. Therefore, as described above, parameter setting shown in FIG. 4 is performed in the DSC 301 having a more advanced UI than that of the printer 302. The value set by the DSC 301 is reflected on that of the printer 302. For example, a wireless communication parameter set in the DSC 301 is stored in the flash ROM 413.

Figure 5:
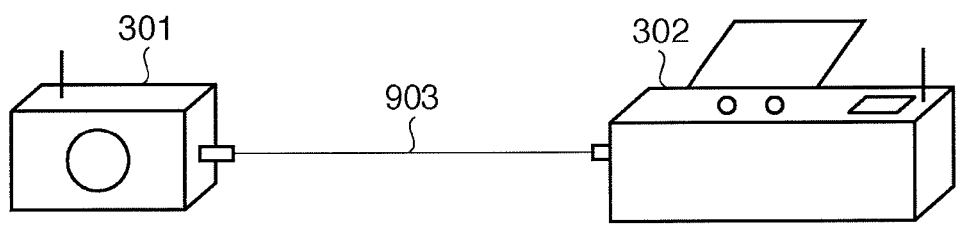
FIG. 5 is a schematic view showing a parameter setting method.
Figure 6:
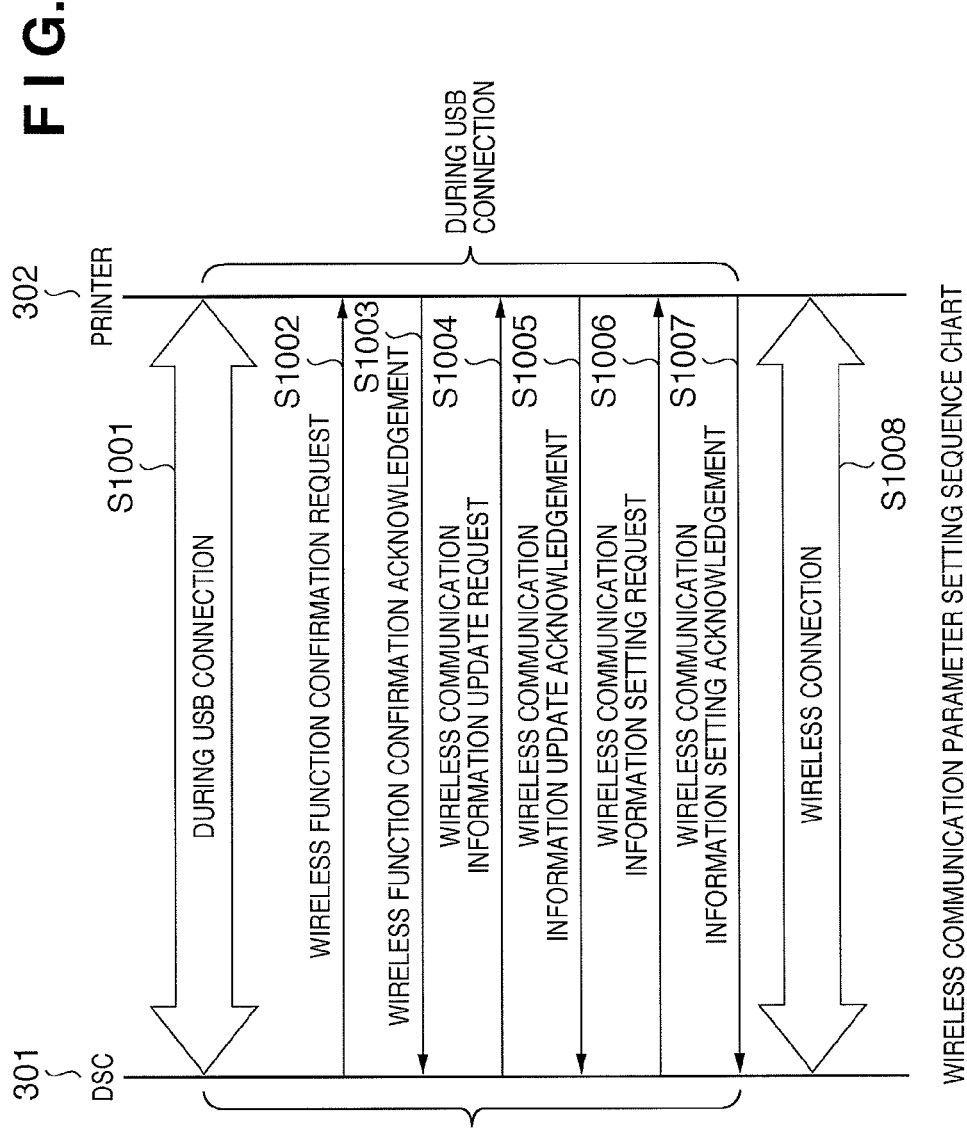
FIG. 6 is a sequence chart showing a parameter setting sequence.

A parameter setting sequence for the printer 302 will be described in detail below with reference to FIGS. 5 and 6. FIG. 5 is a schematic view showing a parameter setting method, and FIG. 6 is a sequence chart showing parameter setting.

First, various parameters shown in FIG. 4 are set in the DSC 301. Next, as shown in FIG. 5, the DSC 301 and printer 302 are wired-connected via a USB cable 903 (step S1001). After that, an initial setting operation is started by pressing a power button while pressing a reset button, or pressing an "initialization start button" which has been set in advance.

Upon starting the initial setting operation, the DSC 301 transmits, via the USB I/F 412, a request command "wireless function confirmation request" for confirming whether the printer 302 has the wireless communication device (step S1002). For example, in accordance with this request contents, the printer 302 confirms whether predetermined information (information indicating the presence of the wireless communication function) is stored on the flash ROM 513 or ROM 516 of the printer 302.

In the first embodiment, the printer 302 comprises the wireless communication device (wireless communication function unit 504, RF unit 505, and the like). Hence, upon reception of the "wireless function confirmation request", the printer 302 issues a response as a "wireless function confirmation acknowledgement" indicating that the printer 302 has the wireless communication function, to the DSC 301 via the USB I/F 512 (step S1003). Note that when the printer issues no response to the DSC 301 after a predetermined period of time has elapsed from transmission of the "wireless function confirmation request", it is determined that the connected device (printer 302) is incompatible with at least the wireless direct print, and the process ends.

Upon reception of the "wireless function confirmation acknowledgement", the DSC 301 can analyze the response contents, and obtain information indicating that the printer 302 comprises the wireless communication device.

Note that when the printer 302 is incompatible with the PS mode function in the ad hoc mode although the parameter "Ad hoc PS" of the DSC 301 is set "ON", mismatching occurs. In this case, upon reception of the "wireless function confirmation request", the printer 302 notifies the DSC 301 in the "wireless function confirmation acknowledgement" that the parameter "Ad hoc PS" cannot be set "ON" because the printer 302 is incompatible with the PS mode function in the ad hoc mode.

Upon reception of this response, the DSC 301 notifies the user via the display unit 506 or the like that the parameter "Ad hoc PS" cannot be set "ON", and that this connection cannot be made unless the parameter "Ad hoc PS" is set "OFF". If the user wants to make this connection even by changing the parameter "Ad hoc PS" to "OFF", the process may be continued by setting the parameter "Ad hoc PS" "OFF". Alternatively, when the user does not want to make this connection, a USB cable is disconnected, and the process is interrupted.

Similarly, when mismatching occurs between the printer 302 and the DSC 301 in another item such as the encryption method, the same process can be performed, and matching can occur. In the following description, assume that the printer 302 is compatible with the PS mode of the Ad hoc mode, and the parameter "Ad hoc PS" is set "ON".

After analyzing the "wireless function confirmation acknowledgement", the DSC 301 transmits, via the USB I/F 412, a "wireless communication information update request" for confirming update of the wireless communication parameter in the printer 302 (step S1004). For example, in accordance with this request contents, the user of the printer 302 confirms whether the wireless setting information of the DSC 301 is set or updated to the flash ROM 513 of the printer 302.

Upon reception of the "wireless communication information update request", after user's confirmation, the printer 302 permits to write data on the flash ROM 513 in order to establish and implement the wireless communication with the DSC 301. After that, the printer 302 issues a response as the "wireless communication information update acknowledgement" indicating that permission, to the DSC 301 via the USB I/F 512 (step S1005).

Upon reception of the "wireless communication information update acknowledgement", in order to set the wireless communication setting information shown in FIG. 4, the DSC 301 transmits the "wireless communication information setting request" with the wireless communication setting information as a parameter, to the printer 302 via the USB I/F 412 (step S1006). For example, in accordance with this request contents, the wireless communication setting information transmitted as the parameter to the flash ROM 513 of the printer is stored in the printer 302.

Upon reception of the "wireless communication information setting request", the printer 302 stores the wireless communication setting information in the flash ROM 513. The printer 302 then issues a response as the "wireless communication information setting acknowledgement" indicating the setting completion, to the DSC 301 via the USB I/F 512 (step S1007).

As described above, since the DSC 301 which supports the USB or wireless communication is once wired-connected to the printer 302, the DSC 301 and printer 302 can share the information required for wireless communication.

After the above-described wireless communication setting information is transmitted from the DSC 301 to the printer 302, the USB cable 903 can be disconnected. When the data is to be output from the DSC 301 to the printer 302 by wireless communication, the printer 302 can be searched for on the basis of the obtained wireless communication setting information, and wirelessly connect to the DSC 301 (step S1008).

Figure 7:
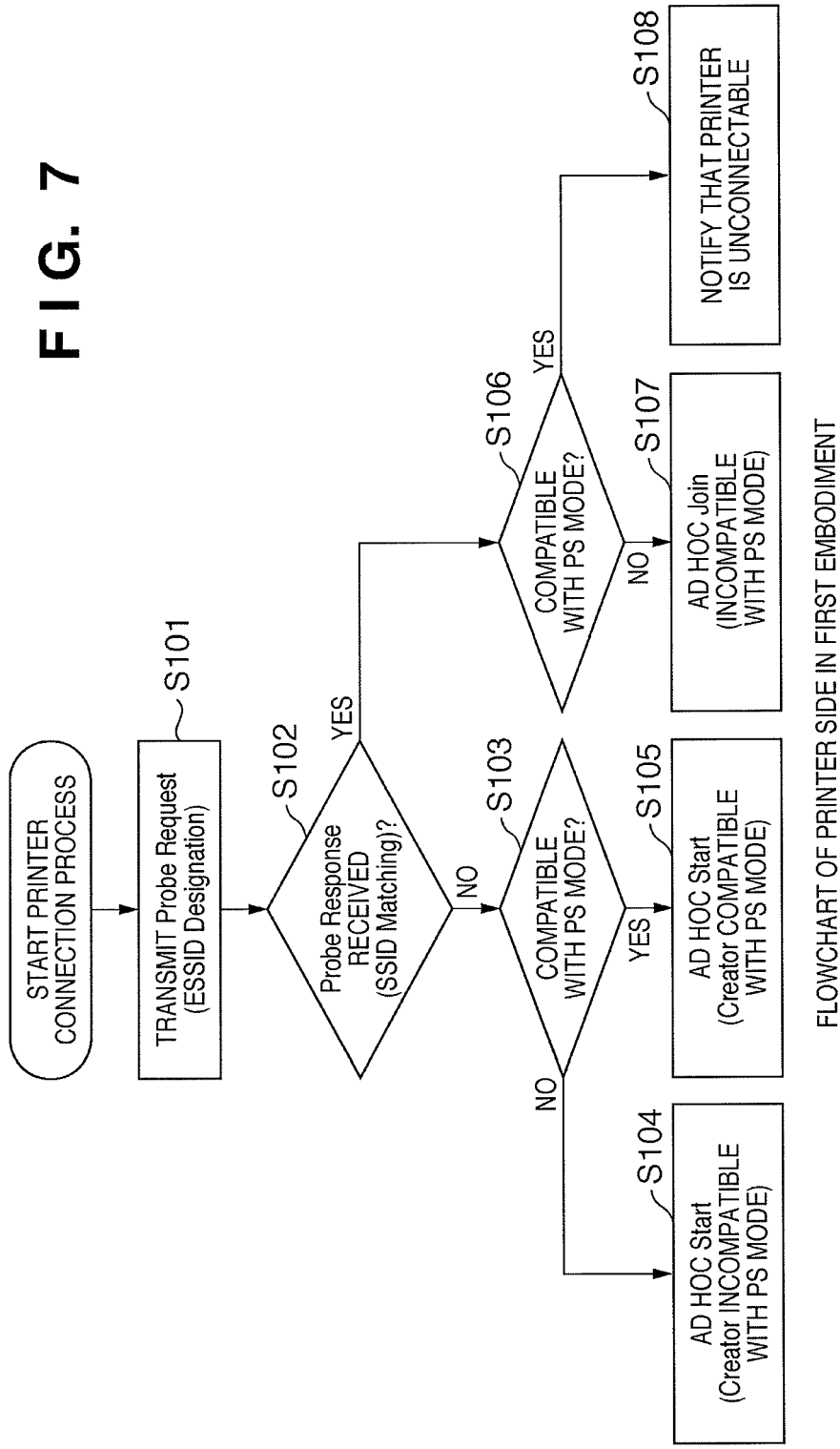
FIG. 7 is a flowchart showing an operation of the printer 302 according to the first embodiment.
Figure 8:
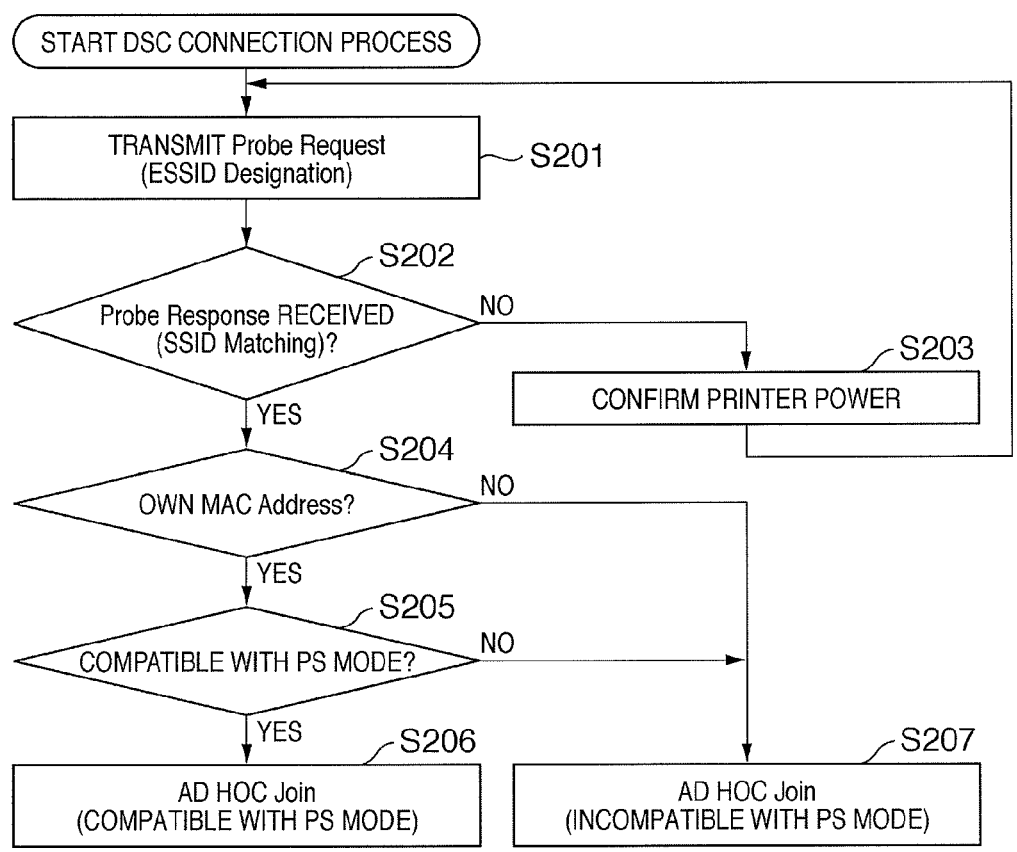
FIG. 8 is a flowchart showing an operation of the DSC 301 according to the first embodiment.

Next, a method of creating the network in which the DSC 301 and the printer 302 operate in the PS mode of the ad hoc mode will be described with reference to FIGS. 7 and 8.

First, the power of the wireless communication function unit in the DSC 301 is turned off to start a connection process of the printer 302. The process will be described in detail with reference to FIG. 7.

In the printer 302, first, information which is notified by the DSC 301 via wired communication and required for wireless communication is set. On the basis of this setting, a scanning process (active scan) is started (step S101). More specifically, a "Probe Request" is transmitted by broadcast, a "Probe Response" received as a response is analyzed, and a wireless space state can be searched for.

The frame formats of the "Probe Request" and "Probe Response" are made in a Management frame format as shown in FIG. 10.

Fields included in this frame will be described below.

In a "Frame Control" field, control information such as a MAC protocol version based on IEEE802.11 standard and the like is stored. In a "Duration" field, for example, a parameter used for a carrier sense and the like is stored. A "BSSID (Basic Service Set IDentification)" field is an arbitrary value which includes 48 bytes for identifying the network.

In a "Sequence Control" field, the sequence number of a MAC frame and a fragment number for a fragment are stored. In a "Frame Body" field, detailed data pertaining to the "Probe Request", "Probe Response", and "Beacon" are stored. In an "FCS" field, error detection codes of a MAC header and the "Frame Body" are stored. In a "DA" field, a transmission destination address is stored. In an "SA" field, a transmission source address is stored.

As a result of the scanning process (step S101), when the printer 302 receives the "Probe Response" having the same value as the ESS ID set in the printer 302 (step S102), the printer 302 recognizes that the network to be created by the printer 302 has already run. That is, the printer 302 recognizes that the network is created by a device other than the DSC 301. If the parameter "Ad hoc PS" in the wireless setting item in FIG. 4 is "OFF" (step S106), the printer 302 incompatible with the PS mode joins the network (step S107).

Alternatively, when the parameter "Ad hoc PS" is set "ON", at this time, it cannot be discriminated whether the device which joins the network is compatible with the PS mode of the ad hoc mode nor whether the device actually runs in the PS mode. Accordingly, reliable data transmission is not guaranteed although the printer 302 joins the network. Hence, the printer 302 notifies the user that the printer 302 cannot connect to the network, and the process ends without joining the network (step S108).

As a result, the user reconfirms and resets the wireless setting items. In the first embodiment, the parameter "Ad hoc PS" is set "ON". Hence, when the "Probe Response" having the same value as the ESS ID set in the printer 302 is received, the process ends (steps S106 and S108).

Alternatively, as a result of the scanning process (step S101), when the "Probe Response" having the same value of the ESS ID set in the printer 302 cannot be received (step S102), the printer 302 recognizes that the network to be created by the printer 302 is not present. The printer 302 then creates the network in accordance with the wireless communication items shown in FIG. 4, i.e., the network compatible with the PS mode of the ad hoc mode (step S105). More specifically, the printer 302 starts transmitting the "Beacon" by setting "ATIM window value≠0" in the "Beacon".

Note that when the printer 302 itself is incompatible with the PS mode and the network incompatible with the PS mode is to be created, the printer 302 transmits the "Beacon" by setting "ATIM window value≠0" in the "Beacon", and the network incompatible with the PS mode is created (step S104).

After the network of the printer 302 has been created, a wireless network joining process of the DSC 301 is started. The process will be described in detail with reference to FIG. 8.

In this case, first, the scanning process (active scan) is also started as in the process in the printer 302 (step S201). The detailed process is the same as that of the printer 302.

As a result of the scanning process (step S201), when the DSC 301 does not receive the "Probe Response" having the same value as the ESS ID set in the DSC 301 (step S202), the network which the DSC 301 is to join is not present. That is, it is determined that the wireless communication function is invalid since the power of the printer 302 is OFF, or that the wireless setting item is incorrectly set. After that, in order to receive the "Probe Response" having the same value as the ESS ID set in the DSC 301, the DSC 301 prompts the user to confirm the power of the printer 302 and reconfirm the wireless setting item (step S203) in place of issuing the "Beacon" from the DSC 301 itself, and then the scanning process is performed again (step S201).

As a result of the scanning process (step S201), when the DSC 301 receives the "Probe Response" having the same value as the ESS ID set in the DSC 301, the DSC 301 analyzes the MAC address included in the "Probe Response" (step S204). The MAC address is stored in the "SA" field in the Management frame format as shown in FIG. 10.

The MAC address is constituted by 48 bits (6 bytes). The vender codes of IEEE network devices are allocated to the first three bytes of this MAC address. Also, a network vender allocates the unique numbers of its products to the remaining three bytes. The DSC 301 registers the first three bytes of the MAC address indicating the device vender which guarantees the PS mode operation in the ad hoc mode, in the ROM 416 and the like as a list shown in FIG. 9.

In step S204, the first three bytes of the MAC address obtained by the "Probe Response" are compared with the list. As a result of comparison, when the first three bytes of the MAC address are held in the list, it is determined that the device serving as a transmission source of the "Probe Response" is a device which guarantees the PS mode operation in the ad hoc mode.

As a result of determination in step S204, when the first three bytes of the MAC address are not held in the list shown in FIG. 9, the PS mode operation is not guaranteed. Hence, the DSC 301 incompatible with the PS mode joins the network (step S107).

Note that the first three bytes of the MAC address may be included in the parameter "Device ID" of the wireless communication setting information shown in FIG. 4 in place of obtaining the first three bytes of the MAC address from the "Probe Response". In this case, in accordance with the wireless communication parameter setting sequence shown in FIG. 6, the first three bytes of the MAC address can be notified between the DSC 301 and the printer 302 by using the "wireless function confirmation request" (step S1002), "wireless function confirmation acknowledgement" (step S1003), "wireless communication information update request" (step S1004), and "wireless communication information update acknowledgement" (step S1005).

In step S204, when the first three bytes of the MAC address are held in the list shown in FIG. 9, the parameter "Ad hoc PS" of the wireless communication item shown in FIG. 4 is confirmed in the DSC 301 (step S205). When it is confirmed that the parameter "Ad hoc PS" is "ON", the DSC 301 joins the network in the PS mode (step S206). Alternatively, when the parameter "Ad hoc PS" is "OFF", the DSC 301 incompatible with the PS mode joins the network (step S207).

In the first embodiment, in the above-described method, the wireless communication setting information is commonly set between the printer 302 and the DSC 301. By using the wireless communication setting information, the ad hoc mode wireless network is created between the printer 302 and the DSC 301. When the printer 302 and DSC 301 operate in the PS mode, data transmission in the network is guaranteed. Therefore, the image sensed by the DSC 301 can be reliably output to the printer 302 while power consumption is reduced.

Note that when the power of the printer 302 is turned off after the image is completely output by the printer 302, the DSC 301 detects the power-off state of the printer 302, and the powers of at least the wireless communication function unit 404 and RF unit 405 are also turned off. This is because if the powers of at least the wireless communication function unit 404 and RF unit 405 are ON in the DSC 301, the DSC 301 issues the "Probe Response" including the ESS ID set in the printer 302 when the power of the printer 302 is turned on again and the scanning process is executed, thus posing a problem.

In order to determine the power-off state of the printer 302, a state confirmation signal may be periodically transmitted from the DSC 301 to the printer 302 to wait for the response. It may be determined that the power of the printer 302 is turned off when no response is received. Alternatively, the "Beacon" transmitted from the printer 302 may be always monitored. It may be determined that the power of the printer 302 is turned off when the "Beacon" is not detected.

Second Embodiment

The second embodiment will be described below. In the first embodiment, the wireless space state is checked by the "active scan scheme" of transmitting the "Probe Request" and receiving the "Probe Response". In contrast to this, in the second embodiment, the wireless space state is checked by a "passive scan scheme". Note that the system arrangement of a wireless communication system is the same as that of the first embodiment shown in FIG. 1. A preparation sequence of creating a wireless network in a PS mode in an ad hoc mode by using a DSC 301 and printer 302 is also the same as that of the first embodiment.

Figure 11:
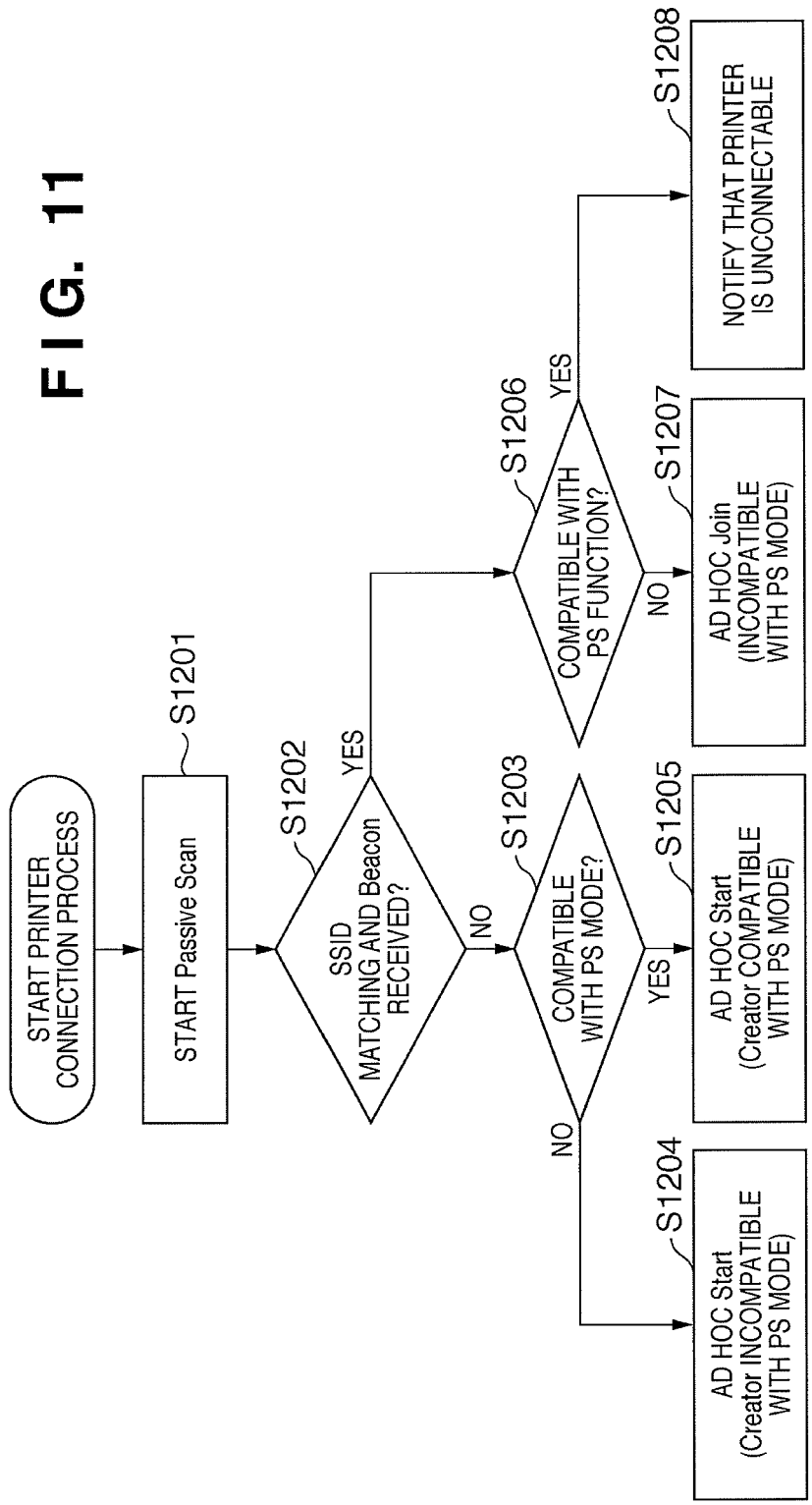
FIG. 11 is a flowchart showing an operation of a printer 302 according to the second embodiment.
Figure 12:
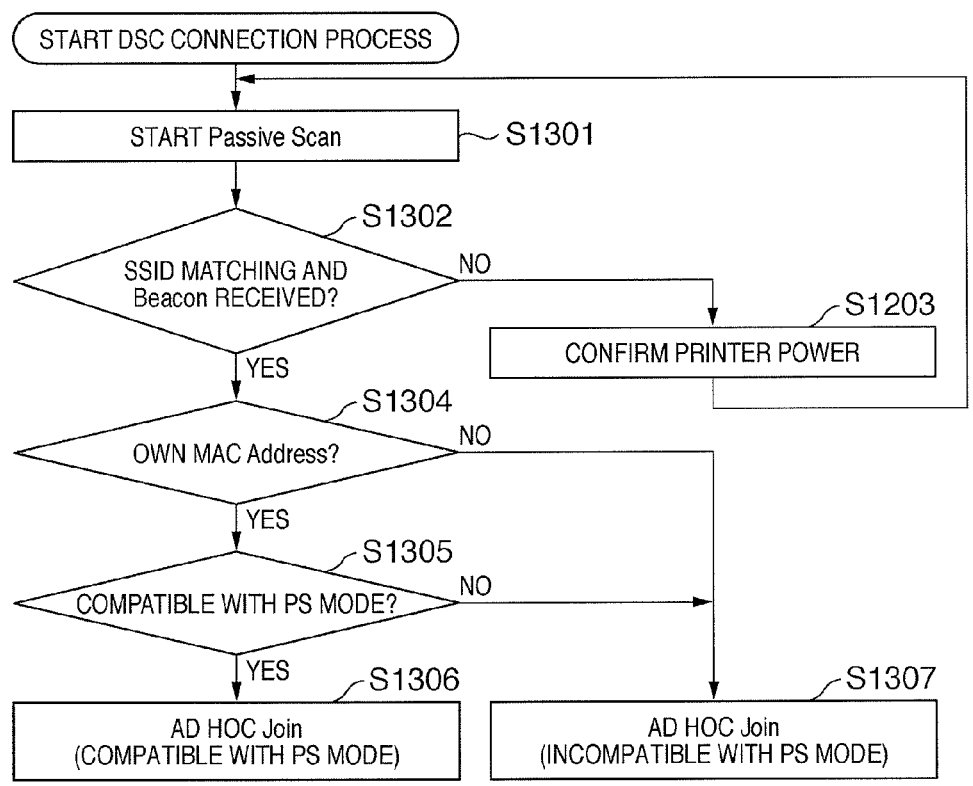
FIG. 12 is a flowchart showing an operation of a DSC 301 according to the second embodiment.
Figure 13:
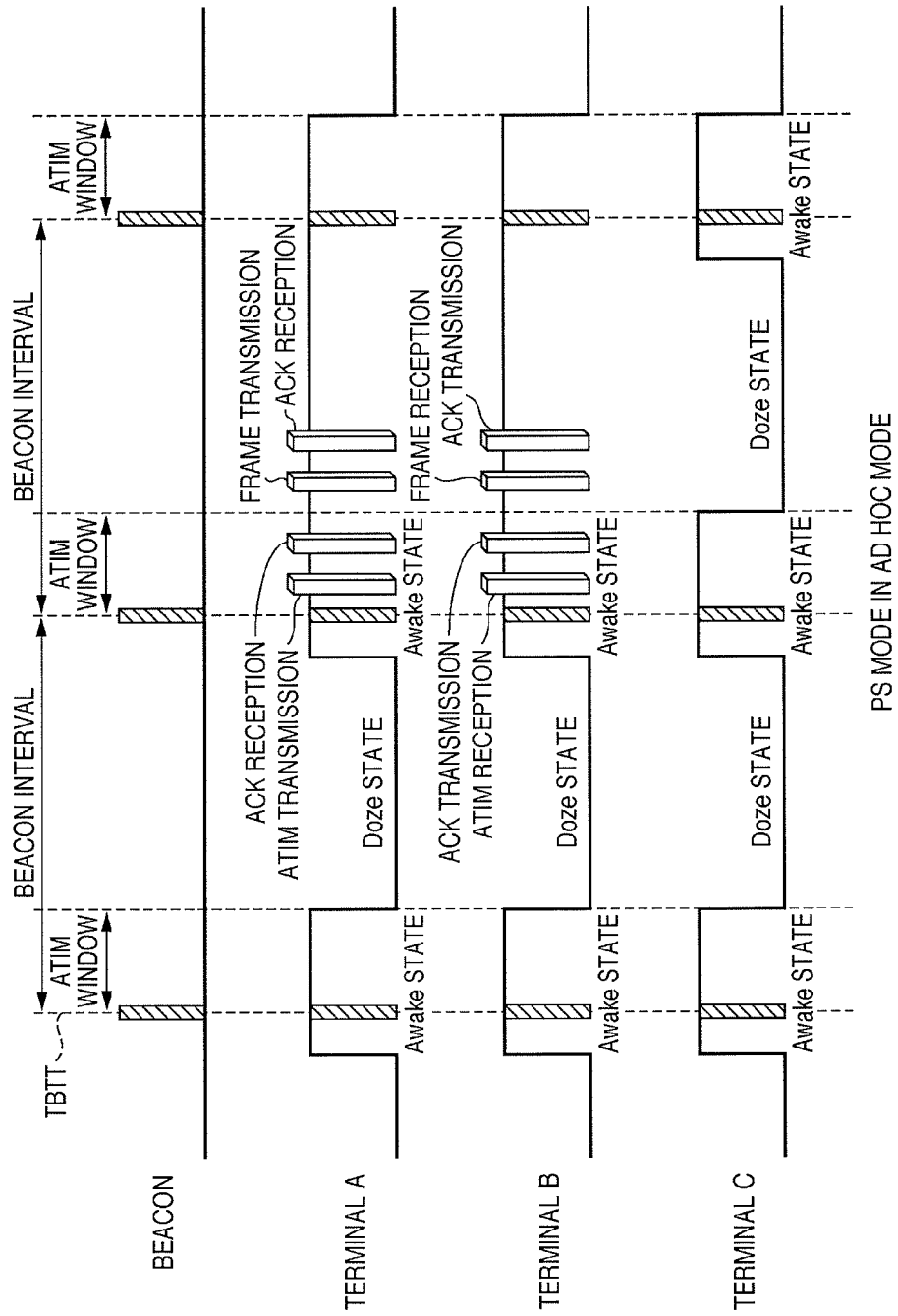
FIG. 13 is a timing chart showing a PS mode in an ad hoc mode.

In the second embodiment, a method of creating the network in the PS mode of the ad hoc mode by using the DSC 301 and printer 302 will be described below with reference to FIGS. 11 and 12.

First, the power of a wireless communication function unit in the DSC 301 is turned off, and a connection process of the printer 302 is started. Details of this process will be described below with reference to FIG. 11.

In the printer 302, first, information which is notified by the DSC 301 and required for wireless communication is set to start a scanning process (passive scan) (step S1201). More specifically, all "Beacon" frames in the wireless space are received and analyzed to check the wireless space state.

A "Beacon" frame format is formed in a Management frame format shown in FIG. 10. Field contents included in this frame are the same as those of the first embodiment.

As a result of the scanning process (step S1201), when the printer 302 receives a "Beacon" having the same value as an ESS ID set in the printer 302 (step S1202), the printer 302 recognizes that the network to be created by the printer 302 has already run. That is, the printer 302 recognizes that the network is created by a device other than the DSC 301. If a parameter "Ad hoc PS" in a wireless setting item in FIG. 4 is "OFF" in the printer 302 (step S1206), the printer 302 incompatible with the PS mode joins the network (step S1207).

Alternatively, when the parameter "Ad hoc PS" is set "ON", at this time, it cannot be discriminated whether the device which joins the network is compatible with the PS mode of the ad hoc mode nor whether the device actually runs in the PS mode. Accordingly, reliable data transmission is not guaranteed although the printer 302 joins the network. Hence, the printer 302 notifies a user that the printer 302 cannot connect to the network, and the process ends without joining the network (step S1208).

As a result, the user reconfirms and resets the wireless setting items. In the second embodiment, the parameter "Ad hoc PS" is set "ON". Hence, when the "Beacon" having the same value as the ESS ID set in the printer 302 is received, the process ends (steps S1206 and S1208).

Alternatively, as a result of the scanning process (step S101), when the "Beacon" having the same value of the ESS ID set in the printer 302 cannot be received (step S1202), the printer 302 recognizes that the network to be created by the printer 302 is not present. The printer 302 then creates the network in accordance with the wireless communication items shown in FIG. 4, i.e., the network compatible with the PS mode of the ad hoc mode (step S1205). More specifically, the printer 302 starts transmitting the "Beacon" by setting "ATIM window value≠0" in the "Beacon".

Note that when the printer 302 itself is incompatible with the PS mode and the network incompatible with the PS mode is to be created, the printer 302 transmits the "Beacon" by setting "ATIM window value≠0" in the "Beacon", and the network incompatible with the PS mode is created (step S1204).

After the network of the printer 302 has been created, a wireless network joining process of the DSC 301 is started. The process will be described in detail with reference to FIG. 12.

In this case, first, the scanning process (passive scan) is also started as in the process in the printer 302 (step S1301). The detailed process is the same as that of the printer 302.

As a result of the scanning process (step S1301), when the DSC 301 does not receive the "Beacon" having the same value as the ESS ID set in the DSC 301 (step S1302), the network which the DSC 301 is to join is not present. That is, it is determined that the wireless communication function is invalid since the power of the printer 302 is OFF, or that the wireless setting item is incorrectly set. After that, in order to receive the "Beacon" having the same value as the ESS ID set in the DSC 301, the DSC 301 prompts the user to confirm the power of the printer 302 and reconfirm the wireless setting item (step S1303), and then the scanning process is performed again (step S1301).

As a result of the scanning process (step S1301), when the DSC 301 receives the "Beacon" having the same value as the ESS ID set in the DSC 301, the DSC 301 analyzes the MAC address included in the "Beacon", and performs a comparison process as in the first embodiment (step S1304). That is, the first three bytes of the MAC address obtained from the "Beacon" are compared with a list shown in FIG. 9, and it is confirmed whether the device serving as a transmission source of the "Beacon" is a device which guarantees the PS mode operation in the ad hoc mode.

As a result of determination in step S1304, when the first three bytes of the MAC address are not held in the list shown in FIG. 9, the PS mode operation is not guaranteed. Hence, the DSC 301 incompatible with the PS mode joins the network (step S1307).

In step S1304, when the first three bytes of the MAC address are held in the list shown in FIG. 9, the parameter "Ad hoc PS" of the wireless communication item shown in FIG. 4 is confirmed (step S1305). When it is confirmed that the parameter "Ad hoc PS" is "ON", the DSC 301 joins the network in the PS mode (step S1306). Alternatively, when the parameter "Ad hoc PS" is "OFF", the DSC 301 incompatible with the PS mode joins the network (step S1307).

In the second embodiment, in the above-described method, the wireless communication setting information is commonly set between the printer 302 and the DSC 301. By using the wireless communication setting information, the ad hoc mode wireless network is created between the printer 302 and the DSC 301. When the printer 302 and DSC 301 operate in the PS mode, data transmission in the network is guaranteed. Therefore, the image sensed by the DSC 301 can be reliably output to the printer 302 while power consumption is reduced.

Note that as in the first embodiment, when the power of the printer 302 is turned off after the image is completely output by the printer 302, the powers of at least the wireless communication function unit 404 and RF unit 405 must also be turned off. This process is the same as that of the first embodiment.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-322325 filed on Nov. 5, 2004, which is hereby incorporated by reference herein.

What is claimed is:

1. A communication apparatus comprising:
a storage device configured to store identification information which is uniquely allocated to the communication apparatus, and a list of identification information which is uniquely allocated to each of other communication apparatuses having a power saving management function;
a communication device having a power saving management function;
a detection device configured to establish communication with another communication apparatus and to detect the identification information of the another communication apparatus that constructs a network which the communication apparatus joins; and
a joining device configured to compare the detected identification information with the list, in case that the detected identification information is not stored in the list, to allow the communication apparatus to join the network by invalidating the power saving management function, and, in case that the detected identification information is stored in the list, to allow the communication apparatus to join the network by validating the power saving management function.

2. A communication method for a communication apparatus having a power saving management function, wherein the communication apparatus comprises a storage device configured to store identification information which is uniquely allocated to the communication apparatus, and a list of identification information which is uniquely allocated to each of other communication apparatuses having a power saving management function, the communication method comprising:
establishing communication with another communication apparatus and detecting identification information of another communication apparatus that constructs a network which the communication apparatus is to join;

comparing the detected identification information with the list;

joining the communication apparatus with the network by invalidating the power saving management function in case that the detected identification information is not stored in the list; and joining the communication apparatus with the network by validating the power saving management function in case that the detected identification information is stored in the list.

3. A communication apparatus comprising:

a communication device having a power saving management function;

a detection device configured to detect a network created by another communication apparatus; and a device configured to join the communication apparatus with the network in accordance with a setting condition of the power saving management function of the communication device, in the case that the network has a predetermined identifier, and configured to create the network having the predetermined identifier, in the case that the network having the predetermined identifier is not detected by the detection device, wherein, in the case that the network having the predetermined identifier is detected by the detection device and the power saving management function of the communication device is invalidated, the communication apparatus does not join the network having the predetermined identifier.

\* \* \* \* \*